(12) United States Patent
Maeda et al.

(10) Patent No.: US 7,044,527 B2
(45) Date of Patent: May 16, 2006

(54) STRADDLE-TYPE VEHICLE

(75) Inventors: Kazuhiro Maeda, Akashi (JP); Ryo Nishizawa, Akashi (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 11/107,313

(22) Filed: Apr. 15, 2005

(65) Prior Publication Data
US 2005/0230992 A1    Oct. 20, 2005

(30) Foreign Application Priority Data
Apr. 16, 2004    (JP)    ............................. 2004-121773

(51) Int. Cl.
*B60R 11/06*    (2006.01)
(52) U.S. Cl. ...................... 296/37.1; 296/198
(58) Field of Classification Search ................ 296/198, 296/37.1, 181.3
See application file for complete search history.

(56) References Cited

U.S. PATENT DOCUMENTS

| | | | |
|---|---|---|---|
| 6,533,339 B1 | 3/2003 | Bettin et al. | |
| 6,719,346 B1 | 4/2004 | Bettin et al. | |
| 6,874,590 B1 * | 4/2005 | Rondeau et al. | ............. 296/198 |
| 2004/0195855 A1 * | 10/2004 | Takeshima | ................. 296/37.1 |

FOREIGN PATENT DOCUMENTS

JP    SHO 62-179880    11/1987

* cited by examiner

*Primary Examiner*—Jason Morrow
(74) *Attorney, Agent, or Firm*—Alleman Hall McCoy Russell & Tuttle LLP

(57) ABSTRACT

A straddle-type vehicle including a front fender configured to cover a front portion of a vehicle body of the vehicle, which is provided with a concave portion formed integrally in the front fender, the concave portion being configured to be recessed toward a front wheel and to open outward of the vehicle body to form a storage portion in which articles are placed for storage.

11 Claims, 11 Drawing Sheets

STRADDLE-TYPE VEHICLE

BACKGROUND OF THE INVENTION

1. Field of the Invention

The present invention relates to a straddle-type vehicle such as a four-wheeled vehicle and, particularly to a storage portion that is provided in a front fender and that is configured to allow desired articles to be placed therein for storage.

2. Description of the Related Art

Typically, a straddle-type vehicle is constructed such that front wheels which are steering wheels are mounted to right and left parts of a front portion of a vehicle body frame by suspension units such as struts, and rear wheels which are driving wheels are mounted to right and left parts of a rear portion of the vehicle body frame by a suspension unit. A front fender and a rear fender cover the front wheels and the rear wheels, respectively, to inhibit splash of sand and dust or muddy water from flying in all directions.

A steering shaft is pivotally mounted to the front portion of the vehicle body frame. A handle is attached to an upper portion of the steering shaft. A seat is mounted behind the handle and over an upper portion of a substantially center section of a vehicle body. Foot boards are mounted below and slightly forward of the seat. Straddling the seat, the operator puts his or her feet on the foot boards and grips the handle. Under this condition, the operator steers the vehicle. When the operator steers the handle to the right or to the left, the right and left front wheels are turned in the same direction, thereby traveling the vehicle in a desired direction.

Since the vehicle body of the above straddle-type vehicle typically has a relatively small size, it is difficult to ensure a space for a storage portion in which articles such as a map or a water bottle are placed for storage. Japanese Utility Model Application Publication No. Sho. 62-179880 discloses a straddle-type vehicle provided with a storage portion in a front fender thereof. Specifically, in the vehicle disclosed in this publication, a front fender is mounted to cover front wheels from above and from behind, and a cover member is mounted to the front fender by fastening bolts from behind so as to surround a part of an outer wall of a rear portion of the front fender to form the storage portion on the front fender. The storage portion has a storage space defined by the outer wall of the front fender and the cover member, and hence protrudes rearward from the outer wall of the front fender.

Because of the relatively small size of the vehicle body, knees of the operator are positioned in the vicinity of the outer wall of the rear portion of the front fender with the operator straddling the seat of the straddle-type vehicle. The knees of the operator may contact the storage portion protruding from the outer wall of the rear portion of the front fender. This may degrade riding comfort.

More often than not, the straddle-type vehicle is used for purposes of rough terrain travel. During the travel of the vehicle, splashes of dust or sand, muddy water, etc, from the front wheels collide against an inner wall of the front fender. In the above described vehicle having the fender provided with the bolt fastening holes to mount the cover member to the front fender, the muddy water may enter the storage portion through a clearance between the bolt holes and the bolts, and may contaminate articles in the storage portion. Further, other structures for a storage portion mounted to protrude from a fender of a straddle-type vehicle are disclosed in U.S. Pat. Nos. 6,533,339 and 6,719,346.

SUMMARY OF THE INVENTION

The present invention addresses the above described condition, and an object of the present invention is to provide a straddle-type vehicle equipped with a storage portion in which articles are placed for storage, which is capable of inhibiting entry of splash of muddy water from a front wheel.

According to the present invention, there is provided a straddle-type vehicle comprising a front fender configured to cover a front portion of a vehicle body of the vehicle, which is provided with a concave portion formed integrally in the front fender, the concave portion being configured to be recessed toward a front wheel and to open outward of the vehicle body to form a storage portion in which articles are placed for storage. In such a construction, since the concave portion formed in the front fender covering the front wheels forms the storage portion, the storage portion does not protrude outward from the front fender, and hence does not contact knees of an operator straddling a seat of the vehicle. In addition, since the concave portion forming the storage portion is formed integrally in the front fender, it is not necessary to form bolt fastening holes in the front fender to mount a cover member to form a storage portion to the front fender. Because of the absence of the bolt holes, the muddy water does not outflow onto an outer wall of the front fender from an inner wall thereof.

The straddle-type vehicle may further comprise a tray which has a concave portion conforming in shape to the concave portion of the front fender and forming the storage portion. The tray may be configured to be mountable to the front fender in such a manner that the concave portion of the tray is fitted to the concave portion of the front fender from a direction in which the concave portion of the front fender opens, and a cover is configured to be attachable to the tray to cover a part of the concave portion of the tray. In such a structure, articles stored in the storage portion may be held therein by the cover. In addition, since the tray and the front fender are separate components, only the tray may be replaced if worn by contact with the articles shaking in the storage portion during the travel of the vehicle.

The concave portion of the front fender may be provided with a bolt receiving portion having a threaded hole, and the tray may be provided with a bolt hole formed to penetrate the tray to conform to the threaded hole of the bolt receiving portion with the concave portion of the tray fitted to the concave portion of the front fender. The tray may be configured to be mountable to the concave portion of the front fender in such a manner that a bolt is inserted through the bolt hole and is fastened to the threaded hole of the bolt receiving portion. In such a construction, the tray may be threadedly mounted to the concave portion of the front fender without bolt holes formed to penetrate the front fender. As a result, entry of the muddy water into the storage portion can be inhibited.

The concave portion of the front fender may be provided with a penetrating hole formed to penetrate the front fender to allow a bolt to be inserted therethrough, and the tray may be provided with a bolt hole formed to conform to the penetrating hole with the concave portion of the tray fitted to the concave portion of the front fender. The tray may be configured to be mountable to the concave portion of the front fender in such a manner that the bolt is fastened to the penetrating hole and the bolt hole with a seal member. In such a structure, by threadedly engaging the tray with the penetrating hole of the front fender, entry of the muddy water into the storage portion can be inhibited.

The seal member may be tubular and have an inner peripheral portion provided with a threaded portion with which the bolt threadedly engages. The seal member may be configured to seal a clearance between the penetrating hole and the bolt with the seal member fitted into the penetrating hole of the front fender and the bolt threadedly engaging with the threaded portion of the seal member.

The front fender may be configured to cover a front wheel from above and from behind. The concave portion of the front fender may be formed in a rear portion of the front fender. Such a structure allows the storage portion to be easily accessible to the operator straddling the seat of the vehicle.

The concave portion of the front fender may be configured to extend from a rear fender section configured to cover a rear portion of the front wheel to an upper fender section configured to cover an upper portion of the front wheel. The concave portion of the front fender may include a rear concave portion formed in the rear fender section and an upper concave portion formed in the upper fender section. In such a structure, a volume of the storage portion can be increased.

The straddle-type vehicle may further comprise a tray that has a concave portion conforming in shape to the concave portion of the front fender and forming the storage portion. The concave portion of the tray may include a rear concave portion and an upper concave portion which conform in shape to the rear concave portion and the upper concave portion of the front fender, respectively. The tray may be configured to be mountable to the front fender in such a manner that the concave portion of the tray is fitted to the concave portion of the front fender from a direction in which the concave portion of the front fender opens. A cover may be configured to be attachable to the tray to cover the rear concave portion of the tray. In this case, in a vehicle equipped with a carrier above the front fender to allow luggage to be placed thereon, it is possible to inhibit the luggage or a luggage mounting member such as a belt from contacting an upper face of the front fender during travel of the vehicle. As a result, the upper face of the front fender is not damaged.

The above and further objects and features of the invention will more fully be apparent from the following detailed description with accompanying drawings.

DETAILED DESCRIPTION OF THE PREFERRED EMBODIMENTS

Figure 1:
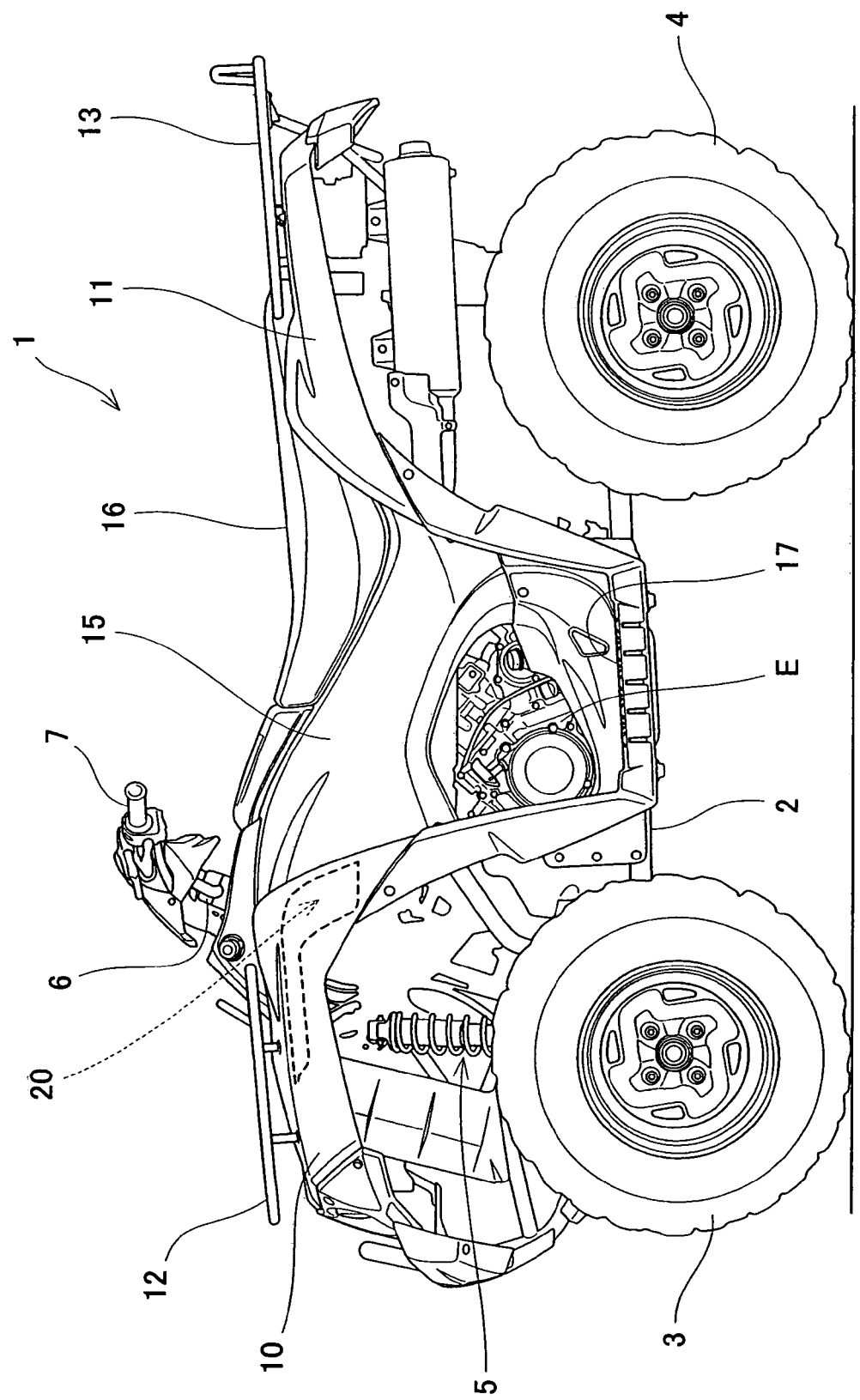
FIG. 1 is a side view of a straddle-type vehicle according to an embodiment of the present invention.

Hereinafter, a straddle-type vehicle according to an embodiment of the present invention will be described with reference to the drawings. Referring now to FIG. 1, a straddle-type vehicle 1 is suitable for use in travel in rough terrain. The vehicle 1 comprises a vehicle body frame 2 forming a frame of a vehicle body, a part of which is shown in FIG. 1, right and left front wheels 3 rotatably mounted to a front portion of the vehicle body frame 2, and right and left rear wheels 4 rotatably mounted to a rear portion of the vehicle body frame 2. The vehicle 1 is equipped with McPherson strut type suspension devices 5 which are configured to suspend the front wheels 3 and which serve to limit a movable range of the front wheels 3 which are vertically movable.

A steering shaft 6 is pivotally mounted to the front portion of the vehicle body frame 2. A bar-type steering handle 7 is attached to an upper portion of the steering shaft 6. By rotating the handle 7 to the right or to the left, an operation of the handle 7 is transmitted to the wheels 3 through the steering shaft 6, a knuckle arm (not shown) and the like, thereby causing the front wheels 3 to be turned to the left or to the right. An engine E is mounted at a substantially center section of the vehicle body frame 2 in a longitudinal direction of the vehicle 1. The engine E is configured to generate a power output according to an operator's rotation of a throttle grip (not shown) attached to a right end portion of the handle 7. The power output generated in the engine E is transmitted to the rear wheels 4 through a transmission (not shown), thereby causing the rear wheels 4 to rotate. As a result, the vehicle 1 gains a driving force.

The front portion and the rear portion of the vehicle 1 are covered by a front fender 10 and a rear fender 11, respectively. A front carrier 12 is mounted above the front fender 10 with a clearance between the front carrier 12 and an upper face of the front fender 10. A rear carrier 13 is mounted above the rear fender 11 with a clearance between the rear carrier 13 and an upper face of the rear fender 11. The front fender 10 is provided with a storage portion 20 in which articles are placed therein for storage, which will be described later.

A side cover 15 is provided between the front fender 10 and the rear fender 11 so as to cover side portions of the center section of the vehicle 1 in the longitudinal direction. A seat 16 is mounted over an upper portion of the side cover 15 to be located behind the handle 7. Foot boards 17 are mounted under the side cover 15 to allow the operator straddling the seat 16 to put his or her feet thereon.

Figure 2:
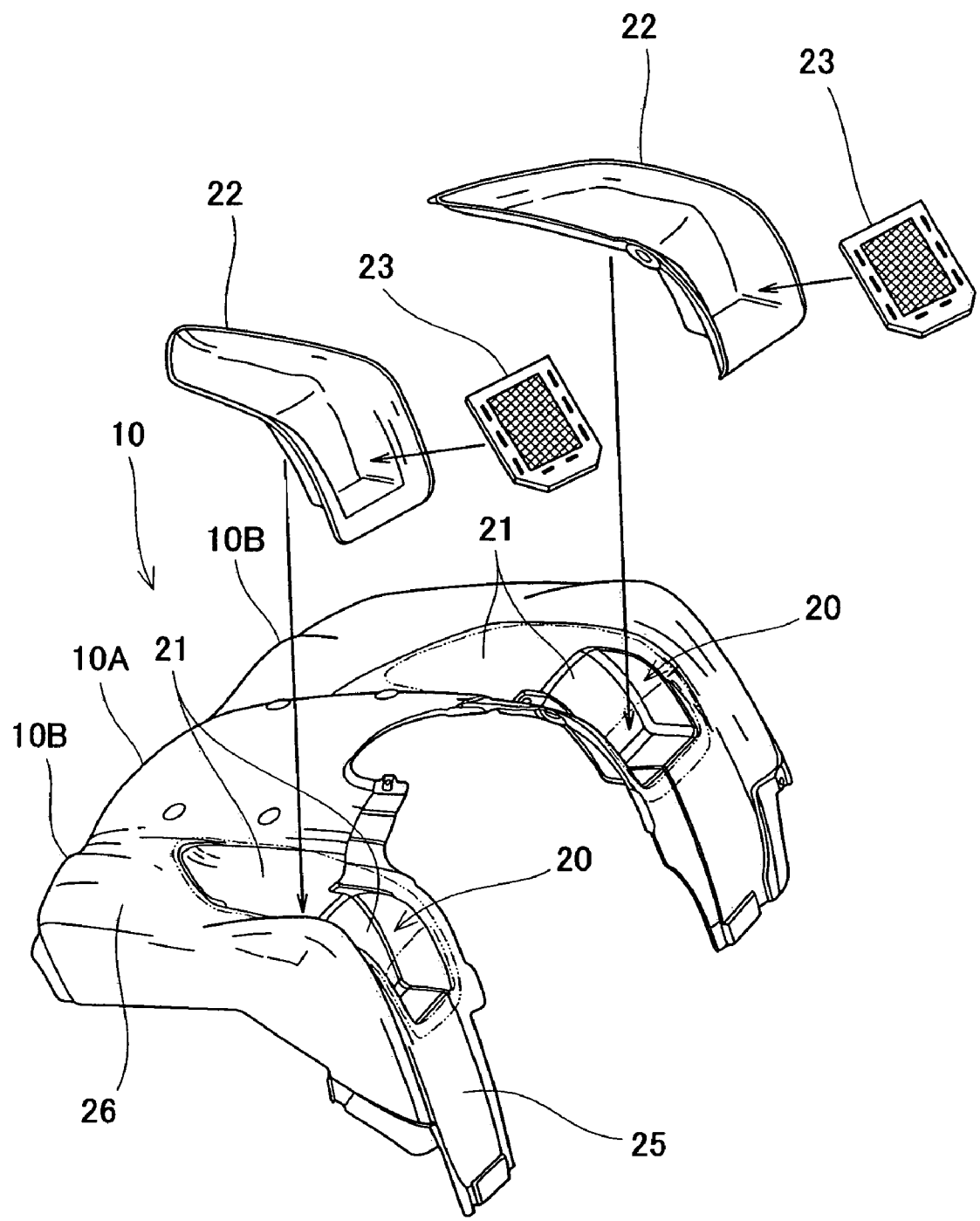
FIG. 2 is an exploded view showing a schematic construction of a storage portion provided in a front fender of the straddle-type vehicle of FIG. 1.

FIG. 2 is an exploded view schematically showing a construction of the storage portions 20 provided in the front fender 10. As shown in FIG. 2, the front fender 10 includes a center section 10A configured to cover a portion of the front portion of the vehicle 1 (see FIG. 1) which is located at a substantially center position in a lateral direction thereof, and side sections (tire housings) 10B disposed on right and left sides of the centre section 10A and configured to cover the front wheels 3 (FIG. 1). Concave portions 21 are formed integrally in the tire housings 10B. Each storage portion 20 is structured such that a tray 22 conforming in shape to the concave portion 21 is fitted to the concave portion 21 of the tire housing 10B, and a net cover 23 is attached to the tray 22.

Figure 3:
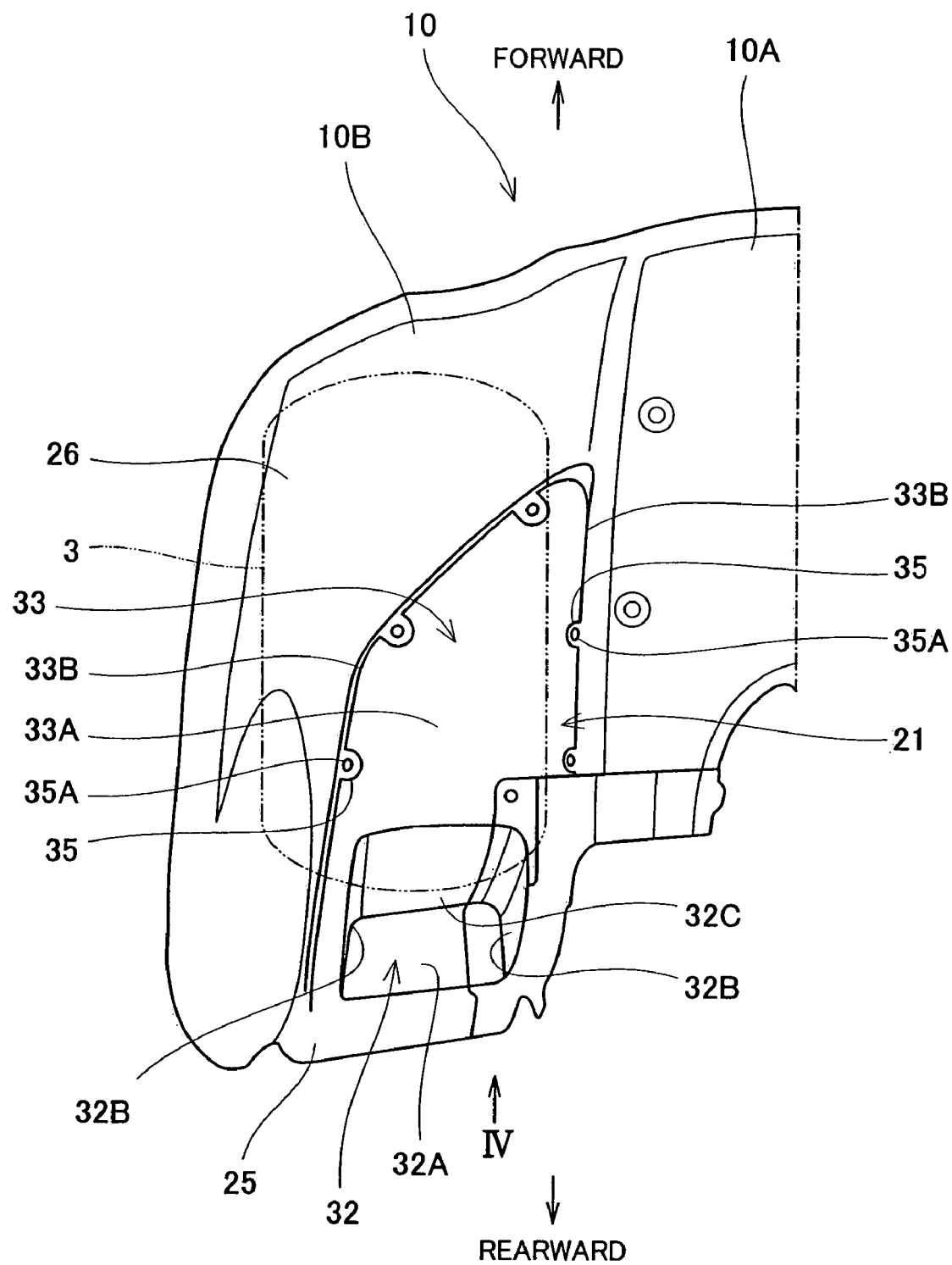
FIG. 3 is a partially enlarged plan view of a left portion of the front fender of FIG. 2.
Figure 4:
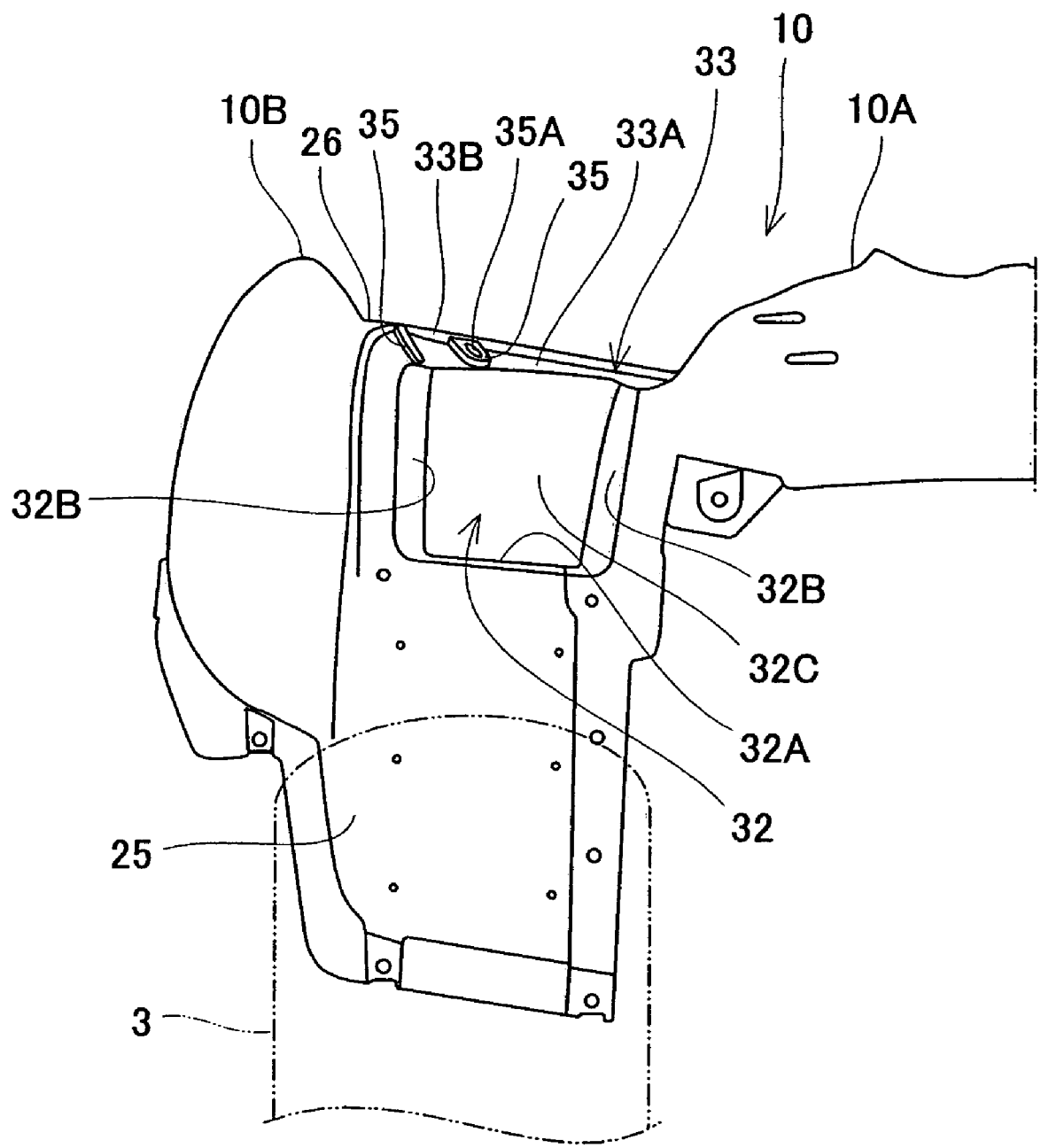
FIG. 4 is a rear view of the front fender, taken in the direction of an arrow IV of FIG. 3.

FIG. 3 is a partially enlarged plan view of a left portion of the front fender 10. FIG. 4 is a rear view of the front fender 10, taken in the direction of an arrow IV of FIG. 3. As shown in FIGS. 2 to 4, the front fender 10 has a unitary molded structure manufactured using a resin mold. Each tire housing 10B includes a rear fender section 25 configured to cover the front wheel 3 from behind and an upper fender section 26 configured to cover the front wheel 3 from above.

The concave portion 21 is formed integrally in an upper portion of the rear fender section 25 to be recessed inward of the tire housing 10B (forward toward the front wheel 3). The concave portion 21 extends from an upper portion of the rear fender section 25, through a rear portion of the upper fender section 26, and forward in the upper fender section 26. In other words, the concave portion 21 is formed integrally in the tire housing 10B to extend from the upper portion of the rear fender section 25 to a substantially center position of the upper fender section 26 in a longitudinal direction of the upper fender section 26. Therefore, the concave portion 21 is recessed downward in the upper fender section 26 (toward the front wheel 3).

As shown in FIGS. 3 and 4, the concave portion 21 includes a rear concave portion 32 formed in the rear fender section 25 and an upper concave portion 33 formed in the upper fender section 26. The rear concave portion 32 is defined by a bottom face 32A, right and left side faces 32B, and a front face 32C and is configured to be recessed forward. The upper concave portion 33 has a bottom face 33A and is recessed to have a small depth. A plurality of bolt receiving portions 35 are provided on a peripheral edge portion 33B of the upper concave portion 33 to allow the tray 22 to be mounted to the concave portion 21 of the front fender 10. The bolt receiving portions 35 are spaced apart from the bottom face 33A and are configured to protrude inward from the peripheral edge portion 33B. The bolt receiving portions 35 have threaded holes 35A formed in resin pieces protruding inward from the peripheral edge portion 33B. Bolts 48 (see FIG. 5) are respectively fastened to the threaded holes 35A. In this structure, the tray 22 is mounted to the tire housing 10B of the front fender 10 without holes formed to penetrate the front fender 10. By fastening the bolts 48 (see FIG. 5) to the threaded holes 35A formed in the bolt receiving portions 35, the tray 22 is fixed to the front fender 22.

Figure 5:
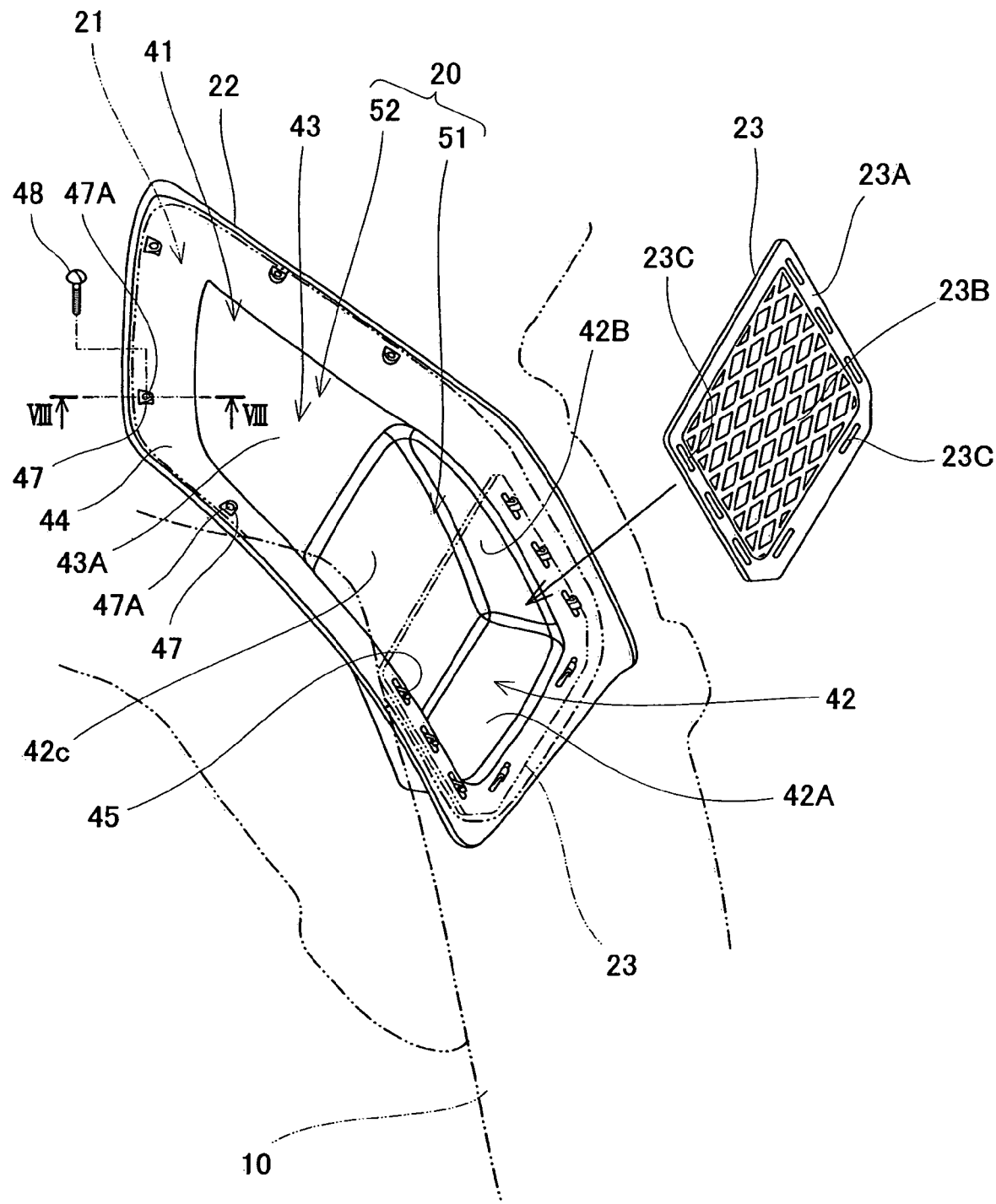
FIG. 5 is an exploded view of a tray and a net cover of the storage portion of FIG. 2.
Figure 6:
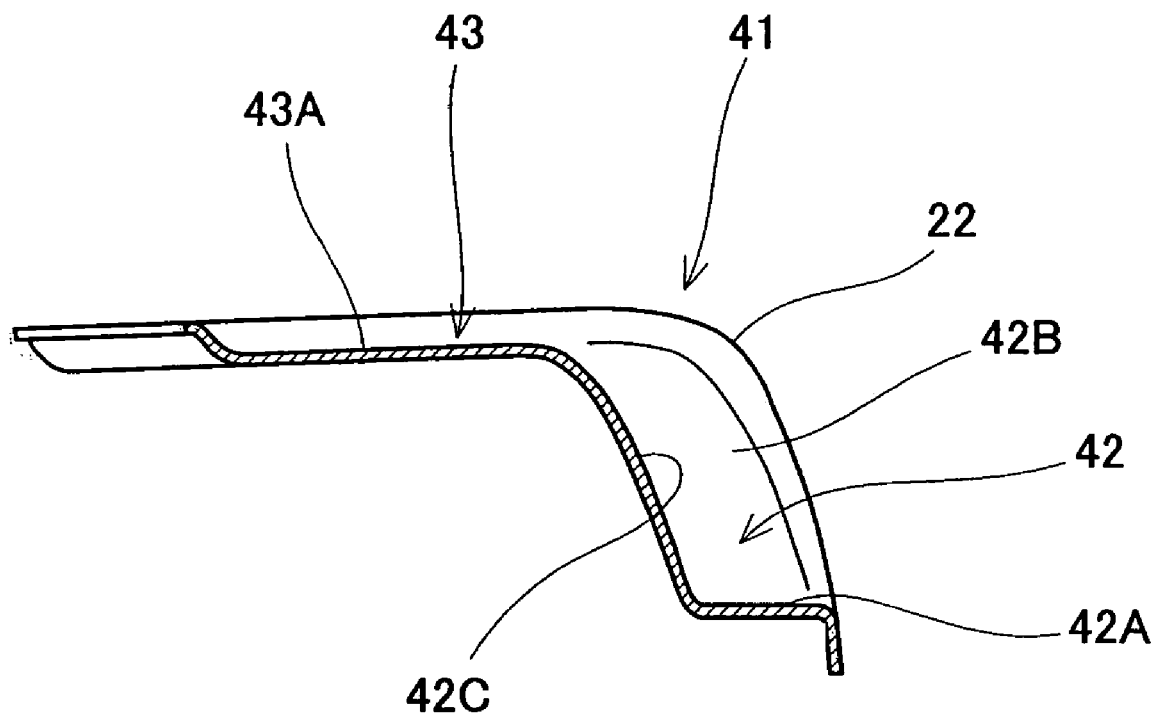
FIG. 6 is a side cross-sectional view of the tray of FIG. 5.

FIG. 5 is an exploded view of the tray 22 and the net cover 23. FIG. 6 is a side cross-sectional view of the tray 22 which is sectioned along the longitudinal direction so as to pass through the center in the lateral direction. As shown in FIG. 5, the tray 22 has a unitary injection-molded structure manufactured using a resin mold. As shown in FIG. 6, the tray 22 is bent as viewed from the side. As shown in FIGS. 5 and 6, the tray 22 has a concave portion 41 conforming in shape to the concave portion 21 formed in the tire housing 10B of FIG. 3. The concave portion 41 formed in the tray 22 has a rear concave portion 42 conforming in shape to the rear concave portion 32 formed in the rear fender section 25 and an upper concave portion 43 conforming in shape to the upper concave portion 33 formed in the upper fender section 26.

As in the rear concave portion 32 of the front fender 10, the rear concave portion 42 of the tray 22 is defined by a bottom face 42A, right and left side faces 42B, and a front face 42C. As in the upper concave portion 33 of the front fender 10, the upper concave portion 43 of the tray 22 has a bottom face 43A and has a small depth. A peripheral portion 44 is formed in an outer peripheral region of the tray 22 to enclose the rear concave portion 42 and the upper concave portion 43 of the tray 22. Hooks 45 are formed integrally on a region of the peripheral portion 44 of the tray 22 so as to correspond to an outer peripheral portion of the rear concave portion 42.

Figure 7:
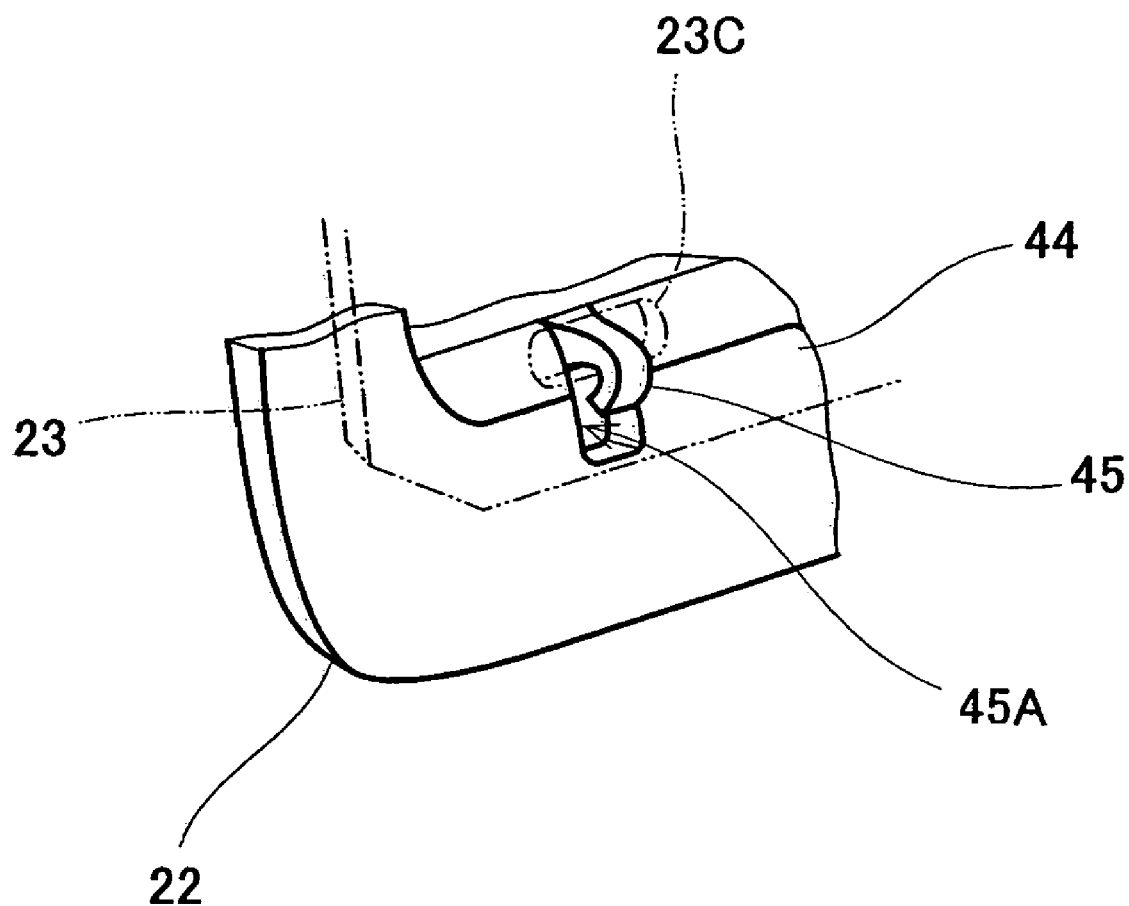
FIG. 7 is a partially enlarged view showing a detailed structure of a hook of FIG. 5.

FIG. 7 is a partially enlarged view of FIG. 5, showing a detailed structure of the hook 45. As shown in FIG. 7, the hook 45 is claw-shaped and is shaped to protrude outward from the peripheral portion 44 of the tray 22. A hole 45A is formed in the vicinity of a base portion of the hook 45 to penetrate the peripheral portion 44. In this embodiment, the hook 45 is formed by injection-molding the resin tray 22 by a simple method and at a low cost, thereby resulting in the hole 45A.

The net cover 23 of FIG. 5 is made of flexible synthetic resin. The net cover 23 includes a peripheral edge portion 23A and a net portion 23B formed inward of the peripheral edge portion 23A. A plurality of hook holes 23C are formed to penetrate the peripheral edge portion 23A. The net cover 23 is disposed to cover the rear concave portion 42 of the tray 22 from behind such that the rear concave portion 42 opens upward. The net cover 23 is attached to the tray 22 in such a manner that the hook holes 23C are brought into engagement with the hooks 45 formed integrally on the tray 22 (see FIG. 7). A plurality of boss portions 47 are formed on a region of the peripheral portion 44 of the tray 22 so as to correspond to an outer peripheral portion of the upper concave portion 43 and are provided with bolt holes 47A. The tray 22 is mounted to the concave portion 21 formed in the tire housing 10B by threadedly engaging bolts 48 with the bolt holes 47A formed in the boss portions 47.

Figure 8:
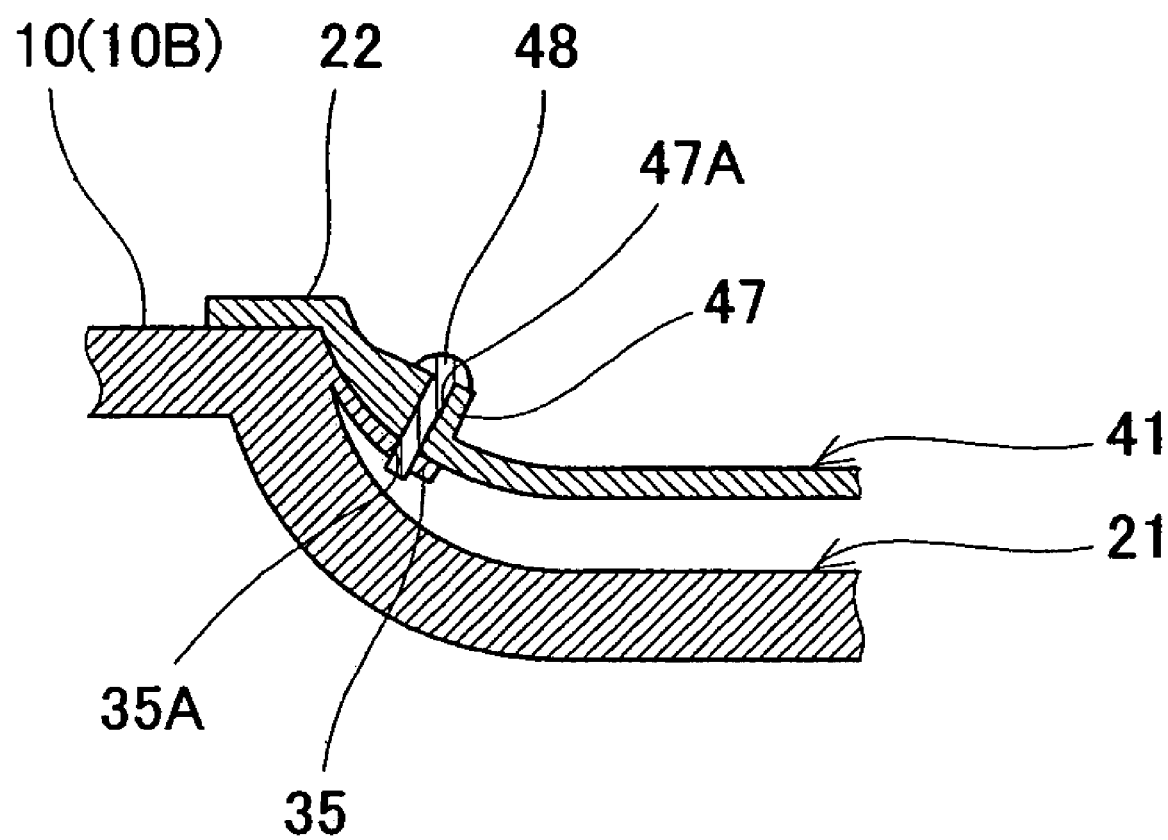
FIG. 8 is a cross-sectional view taken substantially along line VIII—VIII of FIG. 5, showing a configuration in which the tray is mounted to a concave portion of the front fender.

FIG. 8 is a cross-sectional view taken substantially along line VIII—VIII of FIG. 5, showing a configuration in which the tray 22 is mounted to the concave portion 21 of the tire housing 10B. As shown in FIG. 8, the tray 22 covers the concave portion 21 of the tire housing 10B from above, i.e., from the direction in which the concave portion 21 opens such that the threaded holes 35A of the tire housing 10B conform to the bolt holes 47A of the tray 22. Under this condition, the bolts 48 inserted through the bolt holes 47A are threadedly engaged with the threaded holes 35A of the bolt receiving portions 35. As a result, the tray 22 is mounted to the concave portion 21 of the tire housing 10B in such a manner that the tray 22 is fitted to the concave portion 21 as viewed from the direction in which the concave portion 21 opens.

In this embodiment, the tray 22 forms the storage portion 20. More specifically, the storage portion 20 includes a rear storage portion 51 having a storage space formed by the rear concave portion 42 of the tray 22 and the net cover 23 and configured to open upward, and an upper storage portion 52 having a storage space formed by the upper concave portion 43 of the tray 22 (see FIG. 5). It will be appreciated that a net cover may alternatively be provided to cover the upper storage portion 52 from above. In this case, articles stored in the upper storage portion 52 are fixed by the net cover to be stably stored therein during the travel of the vehicle 1.

Figure 9:
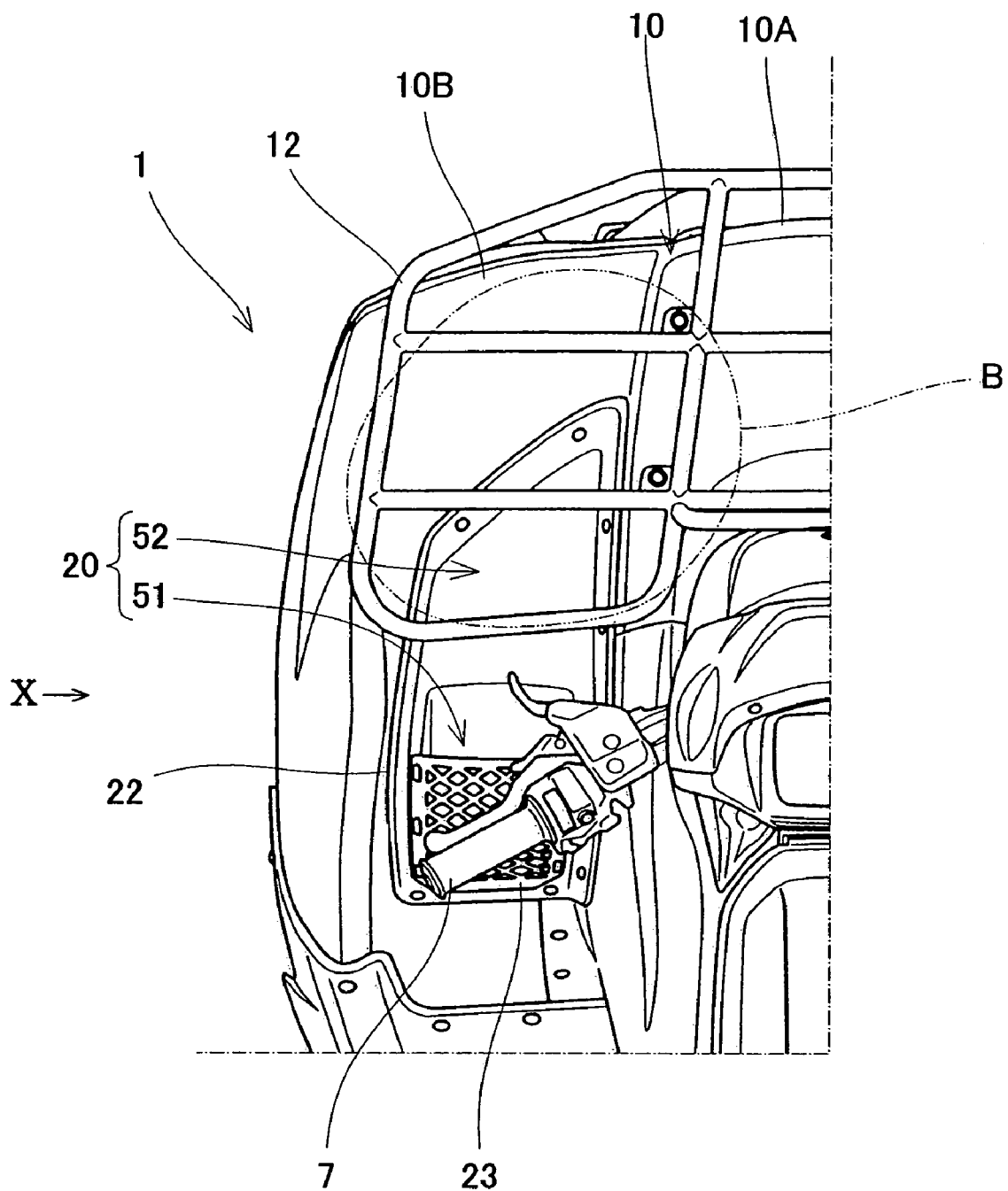
FIG. 9 is a partial plan view of the vehicle, showing a structure surrounding the storage portion of FIG. 2.
Figure 10:
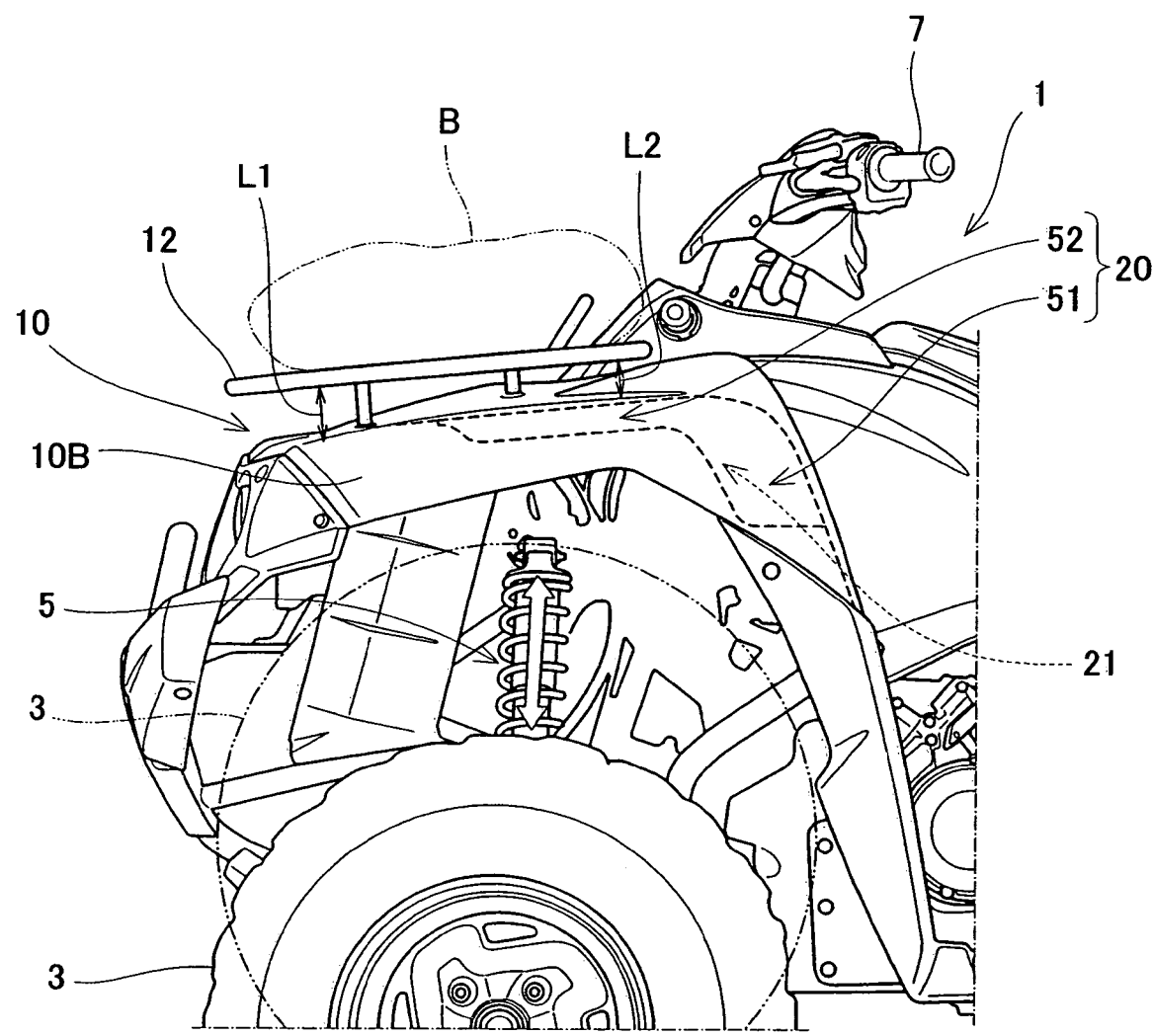
FIG. 10 is a side view of the vehicle, taken in the direction of an arrow X of FIG. 9.

FIG. 9 is a partial plan view of the vehicle 1, showing a structure surrounding the storage portion 20. FIG. 10 is a side view of the vehicle 1, taken in the direction of an arrow X of FIG. 9. As shown in FIGS. 9 and 10, the storage portion 20 is located below the handle 7 to allow the operator straddling the seat 16 to easily access the storage portion 20. Since the storage portion 20 is recessed inward (toward the front wheel 3) so as not to protrude from the outer wall of the front fender 10, knees of the operator straddling the seat 16 do not substantially contact the storage portion 20.

The upper concave portion 43 of the tray 22 forming the storage portion 20 is located below a rear portion of the front carrier 12. As shown in FIG. 10, an upper face of the front fender 10 is inclined forward and downward, and a space between the front fender 10 and the front carrier 12 is shaped such that a front space L1 is larger than a rear space L2. In this structure, luggage B placed on the front carrier 12 may protrude and contact a portion of the front fender 10 which is just below the rear portion of the front carrier 12. However, because of the presence of the tray 22 provided below the rear portion of the front carrier 12 as described above, the protruding luggage B may not directly contact the front fender 10. Therefore, an upper face of the front fender 10 is not damaged.

As shown in FIG. 10, the storage portion 20 is positioned in view of a movable range of the vertically movable front wheel 3 which is limited by the suspension device 5. Specifically, the concave portion 21 formed in the tire housing 10B of the front fender 10 and configured to form the storage portion 20 is positioned not to contact the front wheel 3 when moved to an uppermost position within the movable range. That is, the concave portion 21 is recessed downward from the upper face of the tire housing 10B so as not to contact the front wheel 3 located at the uppermost position. Although not shown, a storage portion on the right side of the vehicle 1 is similarly configured as in the storage portion 20 on the left side of the vehicle 1, shown in FIGS. 3 through 10.

In accordance with the straddle-type vehicle 1 according to this embodiment, the tray 22 and the net cover 23 are mounted to the front fender 10 to form the storage portion 20 without holes formed to penetrate the front fender 10. Therefore, it is possible to inhibit the storage portion 20 from being contaminated by splash of muddy water from the front wheel 3 during the travel of the vehicle 1. In addition, since the storage portion 20 is formed to be recessed relative to the outer wall of the front fender 10, the knees of the operator straddling the seat 16 do not substantially contact the storage portion 20. Further, it is possible to inhibit contact between the front fender 10 and the luggage B placed on the front carrier 12, which may damage the front fender 10.

While the tray 22 is mounted to the front fender 10 by the fastening bolts without providing the holes in the tire housing 10B of the front fender 10 in the embodiment thus far described, it may alternatively be mounted to the front fender 10 by threadedly engaging bolts with the holes formed to penetrate the front fender 10, so long as the entry of the muddy water can be effectively prevented.

Figure 11:
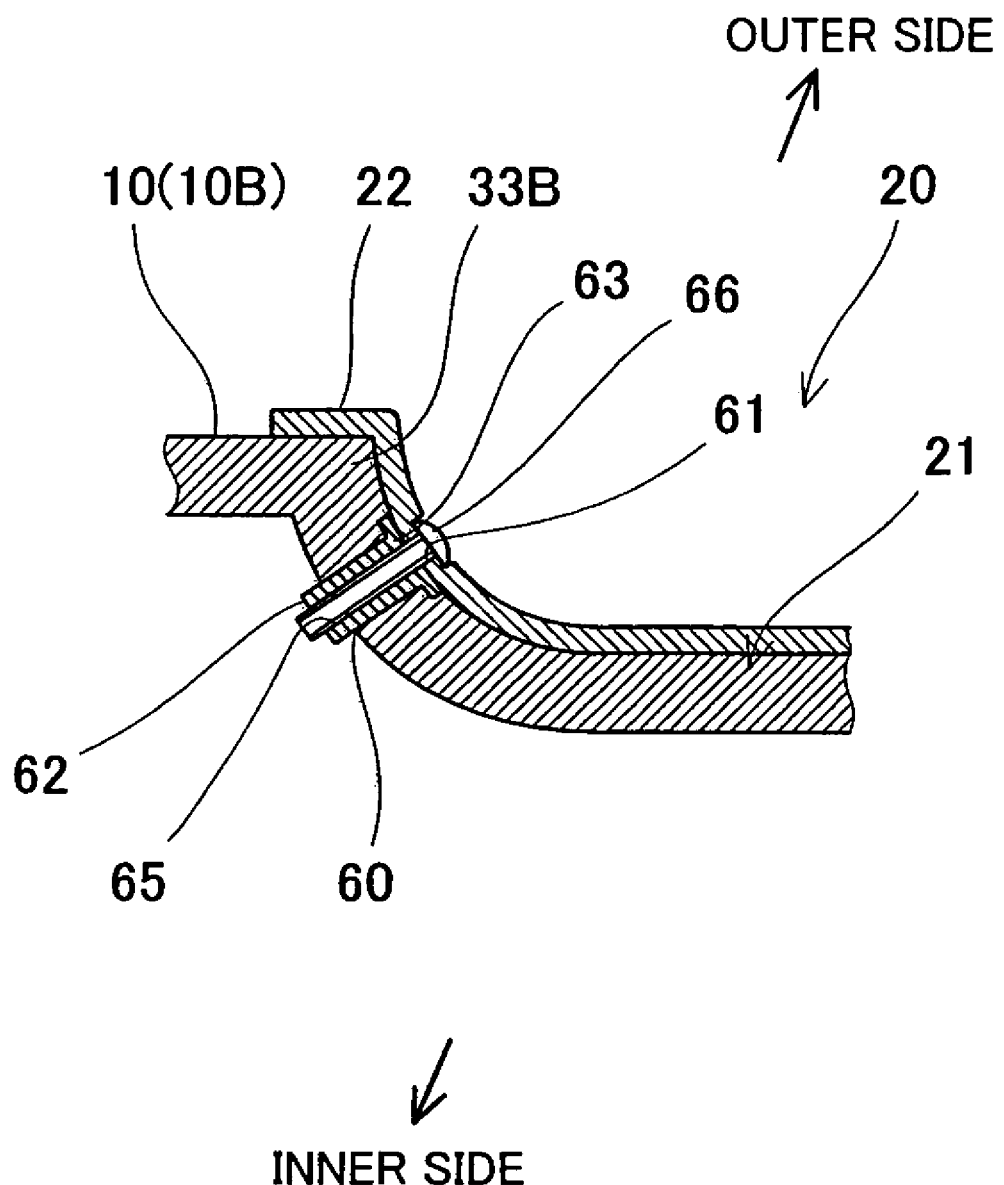
FIG. 11 is a partial cross-sectional view showing another configuration in which the tray is mounted to the concave portion of the front fender.

FIG. 11 is a cross-sectional view showing another configuration in which the tray 22 is mounted to the concave portion 21 formed in the tire housing 10B. As shown in FIG. 11, a penetrating hole 60 is formed in the vicinity of a peripheral edge portion 33B of the concave portion 21 of the tire housing 10B so as to penetrate the tire housing 10B, and a bolt hole 61 is formed in the tray 22 to conform to the penetrating hole 60 with the tray 22 covering the concave portion 21. The penetrating hole 60 has a diameter larger than that of the bolt hole 61. A tubular and flexible rubber seal member 62 is fitted into the penetrating hole 60.

The seal member 62 has a water-proof structure and is a nut having a threaded inner peripheral portion. The seal member 62 is threadedly mountable to the bolt 66 with the seal member 62 fitted into the penetrating hole 60, thereby sealing a clearance between the penetrating hole 60 and the bolt 66. More specifically, a flange portion 63 is formed to protrude radially outward from an outer peripheral face of one end of the seal member 62. A female threaded portion 65 is formed on an inner peripheral face of an opposite end portion of the seal member 62. With the opposite end portion of the seal member 62 located on the inner side, the seal member 62 is fitted into the penetrating hole 60 from outside the tire housing 10B.

With the tray 22 covering the concave portion 21 of the tire housing 10B, the bolt 66 is inserted through the bolt hole 61 of the tray 22 and is threadedly engaged with the female threaded portion 65 of the seal member 62 fitted into the penetrating hole 60 of the tire housing 10B. Under this condition, the bolt 66 is fastened to cause the flexible seal member 62 to contract in an axial direction thereof but to expand in a radial direction thereof so as to increase an outer diameter portion thereof, thus accomplishing sealing of the penetrating hole 60 of the tire housing 10B. With this structure, it is possible to inhibit the splash of the muddy water from the front wheel 3 from flowing into the storage portion 20 through the penetrating hole 60 and the bolt hole 61 during the travel of the vehicle.

While the tray 22 is mounted to the concave portion 21 of the tire housing 10B of the front fender 10 to form the storage portion 20 in the embodiments described above, the concave portion 21 itself may alternatively serve as a storage portion without the tray 22. In this case, protruding hooks may be formed on the peripheral edge portion of the concave portion 21, and a net cover may engage with the hooks to be mounted to the concave portion 21.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A straddle-type vehicle comprising:
    a front fender configured to cover a front portion of a vehicle body of the vehicle, which is provided with a concave portion having a bottom portion and being formed integrally in the front fender, the concave portion being configured to be recessed toward a front wheel and to open outward of the vehicle body to form a storage portion in which articles are placed for storage; and
    a tray which has a concave portion conforming in shape to the concave portion of the front fender and forming the storage portion;
    wherein the tray is configured to be mountable to the front fender in such a manner that the concave portion of the tray is fitted to the concave portion of the front fender from a direction in which the concave portion of the front fender opens;
    wherein the storage portion has a double-walled bottom portion including the concave portion of the front fender and the concave portion of the tray; and
    wherein a cover is configured to be attachable to the tray to cover a part of the concave portion of the tray.

2. The straddle-type vehicle according to claim 1,
    wherein the concave portion of the front fender is provided with a penetrating hole formed to penetrate the front fender to allow a bolt to be inserted therethrough, and the tray is provided with a bolt hole formed to conform to the penetrating hole with the concave portion of the tray fitted to the concave portion of the front fender; and wherein the tray is configured to be mountable to the concave portion of the front fender in such a manner that the bolt is fastened to the penetrating hole and the bolt hole with a seal member.

3. The straddle-type vehicle according to claim 2, wherein the seal member is tubular and has an inner peripheral portion provided with a threaded portion with which-the bolt threadedly engages; and wherein the seal member is configured to seal a clearance between the penetrating hole and the bolt with the seal member fitted into the penetrating hole of the front fender and the bolt threadedly engaging with the threaded portion of the seal member.

4. The straddle-type vehicle according to claim 1, wherein the concave portion of the front fender is provided with a bolt receiving portion having a threaded hole which opens outward of the front fender and does not penetrate the front fender, and the tray is provided with a bolt hole formed to penetrate the tray to conform to the threaded hole of the bolt receiving portion with the concave portion of the tray fitted to the concave portion of the front fender; and wherein the tray is configured to be mountable to the concave portion of the front fender in such a manner that a bolt is inserted through the bolt hole and is fastened to the treaded hole of the bolt receiving portion.

5. A straddle-type vehicle comprising:

a front fender configured to cover a front portion of a vehicle body of the vehicle, which is provided with a concave portion formed integrally in the front fender, the concave portion being configured to be recessed toward a front wheel and to open outward of the vehicle body to form a storage portion in which articles are placed for storage; and a cover configured to cover the concave portion;

wherein the front fender is configured to cover a front wheel from above and from behind;

wherein the concave portion of the front fender includes a rear concave portion that is configured to have a bottom wall extending substantially horizontally, a front wall extending upward from a front end portion of the bottom wall and side walls extending upward from lateral end portions of the bottom wall and extending rearward from lateral end portions of the front wall, and is configured to open rearward and upward in a rear fender section of the front fender, which covers a rear portion of the front wheel;

wherein the cover is attached to the rear fender section so as to be opposite to the front wall; and wherein the storage portion includes the cover, the bottom wall, the front wall, and the side walls and is configured to open upward.

6. The straddle-type vehicle according to claim 5, wherein the concave portion of the front fender further includes an upper concave portion that is formed in the upper fender section so as to extend from the rear concave portion and is configured to open upward.

7. The swaddle-type vehicle according to claim 1, wherein the concave portion of the front fender includes a rear concave portion that is configured to have a bottom wall extending substantially horizontally, a front wall extending upward from a front end portion of the bottom wall, and side walls extending upward from lateral end portions of the bottom wall and extending rearward from lateral end portions of the front wall, and wherein the concave portion of the front fender is configured to open rearward and upward in a rear fender section of the front fender, which covers a rear portion of the front wheel; and wherein the concave portion of the tray includes a rear concave portion that is configured to have a bottom wall extending substantially horizontally, a front wall extending upward from a front end portion of the bottom wall, and side walls extending upward from lateral end portions of the bottom wall and extending rearward from lateral end portions of the front wall, and wherein the concave portion of the tray is configured to open rearward and upward.

8. The straddle-type vehicle according to claim 7, wherein the cover is attached to the tray so as to be opposite to the front wall of the tray; and wherein the storage portion includes the cover, the bottom wall of the tray, the front wall of the tray, and the side walls of the tray and is configured to open upward.

9. The straddle-type vehicle according to claim 8, wherein the cover is removably attached to the tray via hooks provided on the tray.

10. The straddle-type vehicle according to claim 9, wherein the cover has holes at a peripheral region thereof, with which the hooks engage, and a net portion at a center region thereof that is configured to be expandable and contractable.

11. The straddle-type vehicle according to claim 8, wherein the concave portion of the front fender further includes an upper concave portion that is formed in the upper fender section so as to extend from the rear concave portion, and wherein the concave portion is configured to open rearward.

* * * * *